No. 723,369. PATENTED MAR. 24, 1903.
R. W. CONANT.
APPARATUS FOR MEASURING ELECTRICAL RESISTANCES.
APPLICATION FILED SEPT. 29, 1902.
NO MODEL. 2 SHEETS—SHEET 1.

Witnesses.
C. H. Garrett
J. Murphy

Inventor.
Roger W. Conant
by Jas. H. Churchill
atty.

No. 723,369. PATENTED MAR. 24, 1903.
R. W. CONANT.
APPARATUS FOR MEASURING ELECTRICAL RESISTANCES.
APPLICATION FILED SEPT. 29, 1902.
NO MODEL. 2 SHEETS—SHEET 2.

Witnesses.
Inventor:
Roger W. Conant
by Jas. H. Churchill
atty.

UNITED STATES PATENT OFFICE.

ROGER W. CONANT, OF CAMBRIDGE, MASSACHUSETTS.

APPARATUS FOR MEASURING ELECTRICAL RESISTANCES.

SPECIFICATION forming part of Letters Patent No. 723,369, dated March 24, 1903.

Application filed September 29, 1902. Serial No. 125,176. (No model.)

*To all whom it may concern:*

Be it known that I, ROGER W. CONANT, a citizen of the United States, residing in Cambridge, in the county of Middlesex and State of Massachusetts, have invented an Improvement in Apparatus for Measuring Electrical Resistances, of which the following description, in connection with the accompanying drawings, is a specification, like characters on the drawings representing like parts.

This invention relates to an apparatus for rapidly and efficiently measuring electrical resistances, and is especially applicable for measuring the resistance of rail-joints in the tracks of electric-railway systems.

The present invention is an improvement upon the invention shown and described in United States Letters Patent No. 645,384, granted to me March 13, 1900, and has for one of its objects to provide a testing apparatus which can be worked by a single operator.

Another feature of the present invention consists in providing a novel contact device, as will be described, whereby a more efficient connection with the rails of the track may be obtained.

These and other features of this invention will be pointed out in the claims at the end of this specification.

Figure 1:
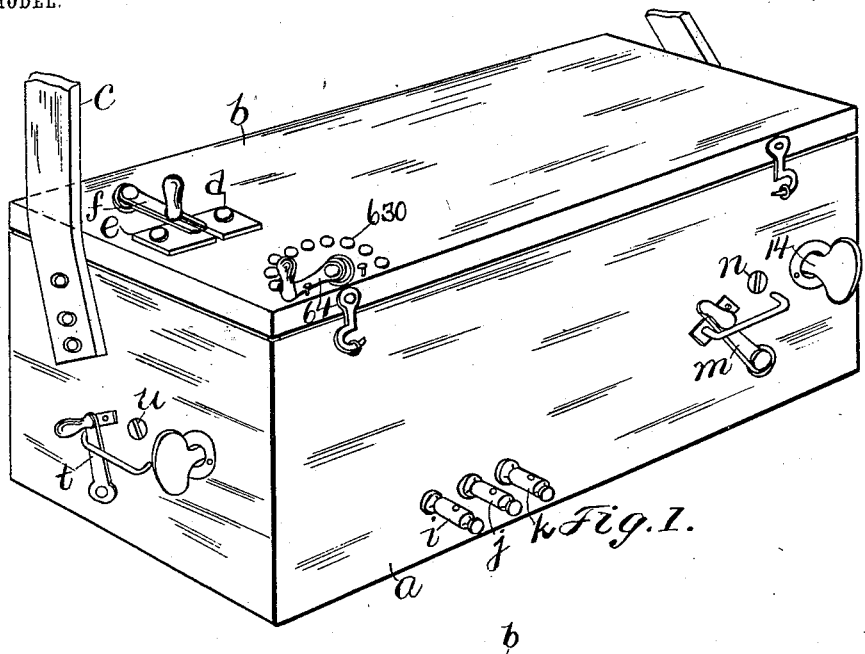
Figure 2:
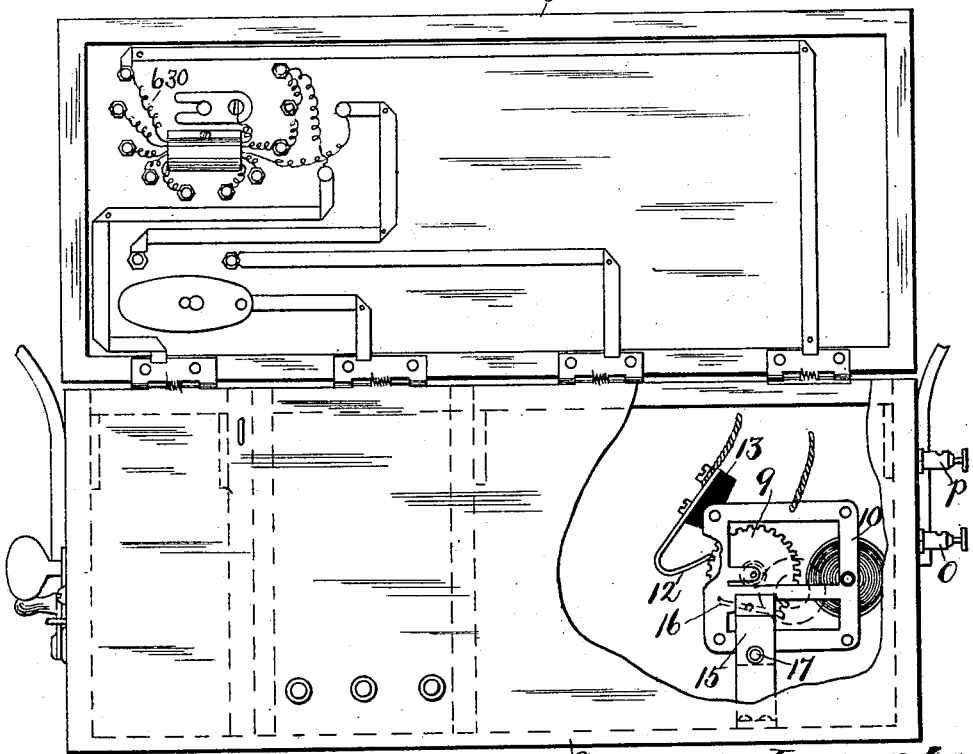
Figures 3, 4, 5:
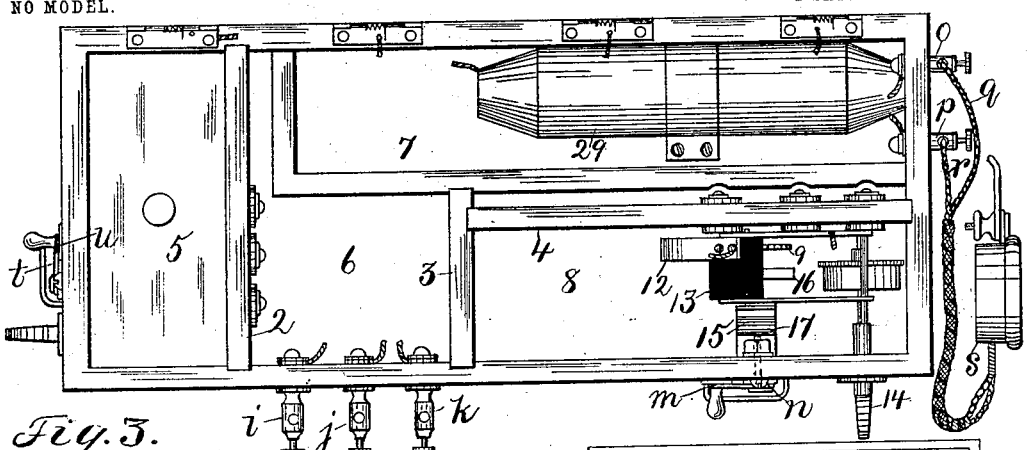

Figure 1 is a perspective view of a box or case forming part of an apparatus embodying this invention; Fig. 2, a front elevation of the box or case shown in Fig. 1 with its cover raised and its front side partially broken away; Fig. 3, a plan view of the box or case with its cover removed; Fig. 4, a diagram of circuits illustrating the operation of the invention and including in elevation a portion of two rails and my improved contact device, and Fig. 5 a diagram of circuits illustrating a modification to be referred to.

The main portion of the apparatus herein shown as embodying this invention is substantially such as shown and described in the patent referred to. It consists, essentially, of the box or case $a$, provided with the cover $b$ and strap $c$, and the terminal plates $d\,e$ on the cover $b$, with which coöperates the switch-lever $f$, which is adapted to make contact with either terminal or to bridge them. The case or box is provided with the binding-posts $i\,j\,k$ and with the lever $m$ and circuit terminal or button $n$. It is further provided with the binding-posts $o\,p$, with which are adapted to be connected the wires $q\,r$ of the telephone-receiver $s$. The box or case is also provided with the lever $t$ and terminal $u$ and is separated by the partitions 2 3 4 into the compartments 5, 6, 7, and 8, the compartments 5 8 being designed to contain duplicate circuit-breakers, only one of which is shown and which consists of the break-wheel 9, clock mechanism 10, and contact-spring or terminal pen 12, mounted on the insulating-block 13. The clock mechanism is adapted to be wound by the key 14, and the break-wheel is held at rest by the spring-arm 15, which engages the shaft or pivot of the escapement-fan 16. The spring-arm 15 has extended through it the pivot 17 for the lever $m$ and is adapted to be disengaged from the shaft of the escapement-fan when the lever $m$ is thrown over onto the terminal button $n$, which latter forces the lever $m$ outward and draws the spring-arm 15 away from the escapement-shaft 16. The terminal pen or brush 12 and the switch $m$ are included in circuit with the telephone $s$, the pen 12 being connected with the binding-post $j$ by the wire 20. The spring-arm 15 is connected by wire 19 with the clock-frame. The outside binding-posts $k\,i$ are connected within the box to the terminals $d\,e$, and the lever $f$ is connected by wires 24 25 with the binding-post $p$, and the binding-post $o$ is connected by wires 31, 32, and 33 to the terminal $n$. The wire 24 is connected by wire 26, coil 29, and wire 30 to the wire 31. The binding-posts $i\,j\,k$ are adapted to have connected to them the flexible conductors 40 41 42, connected with portable circuit-terminals 43 44 45. The circuit-terminals 43 44 45 in accordance with one feature of this invention are adapted to be mechanically connected together, so as to form one piece of apparatus, which may for sake of convenience be termed a "tripartite" portable contact apparatus, which may be made as herein shown.

Referring to Fig. 4, the contact apparatus referred to consists of a center pole 50, of wood or other suitable material, provided with a steel chisel forming the center contact member or terminal 44, to which are secured, as by the thumb-screw 52, two metal knees or angle-irons 53 54, having suitably attached to them two extension beams or spring-arms 56 57, of wood or other suitable material, which carry at their free ends the two terminals 43 45, preferably chisel-shaped and arranged with their cutting edge substantially at right angles to the cutting edge of the center terminal 44 and extended in the direction of the length of the rails 60 61, with which they are designed to make contact and which form a part of the return for the electric-railway system. The extension beams or arms 56 57 are secured to the center pole a distance from its end or point sufficient to cause the center contact or terminal to be elevated above the rail, preferably about one inch, when the outer terminals or contact-points are in engagement with the rails. The center terminal is brought in contact with the rail by pressure applied by the foot of the operator to one of the extension beams or arms near the center pole. When pressure is thus applied to the extension-beam, it will be seen that the beam or arm is depressed or sprung downward and the outer ends of the beams are caused to move longitudinally of the rails, thereby moving the outer terminals along the rails and causing their sharp edges to cut into the rails and make a perfect contact therewith. This cutting effect of the outside terminals may be intensified or increased by moving the upper end of the center pole 50 back and forth, while its chisel-point is held in firm contact with the rail and acts as a fulcrum for the elbow-levers formed by the center pole and the extension-beams. The rocking movement referred to enables the end chisels to cut through the hard scale on the rail produced by the rolling action of the car-wheels and does not disturb the contact of the center chisel. The chisel-shaped terminals are preferably made of the best quality and temper of steel. It will be noticed that the extension-beams can be quickly and easily detached from or attached to the center pole by the single thumb-screw 52, thereby enabling the three parts of the contact apparatus to be gathered together and easily carried.

Within the box or case $a$ is a rheostat or resistance 630, which, as shown in Fig. 4, has one end connected by the wire 21 with the binding-post $k$ and its other end connected by wire 63 with the binding-post $j$ through the wire 20. The resistance 630 is provided with a series of points or buttons with which coöperate a switch-lever 64, which is connected to the terminal plate $d$ through a resistance 65. The resistance 630 is graduated and its points have a fixed ratio with the other side of the instrument—that is, with a standard resistance—which in the present case is the length of rail between the chisels or terminals 43 44, which length for convenience may be three feet. In Fig. 4 the ratio referred to is represented as one, 1.5, two, three, four, six, eight, fifteen, thirty, ninety. The purpose of the rheostat 630 is to enable the operator to make the opposing drops of potential equal on both sides of the instrument, which fact is manifested at the telephone by the absence of sound, or it may be manifested in a galvanometer or like instrument 66 (see Fig. 5) by the position of the needle thereof. The binding-post $i$ is connected to the terminal plate $e$ by the wire 22, which includes the resistance 67.

The operation of the apparatus may be readily understood from the diagram shown in Fig. 4. The operator places the tripartite contact apparatus upon the rails with the center terminal 44 and the outer terminal 45 substantially equidistant on opposite sides of the rail-joint 68. He then applies his foot to the beam or arm 57 and brings the center terminal into firm contact with the rail 60, and, if desired, he then rocks the pole back and forth, as indicated by dotted lines, thereby obtaining a most efficient contact of the terminals 43 45 with the rails 60 61. The switch-lever $f$ is placed in its central position bridging the terminals $d\ e$, and the circuit-breaker is then set in operation by moving the lever $m$ onto the terminal button $n$. The operator then moves the rheostat-lever 64 from the first point at which a roaring or loud sound is heard in the telephone to the point on the scale at which the sound in the telephone is diminished appreciably and is weakest or no sound is heard. The current for the telephone is supplied from the rails 60 61 and is due to the drop in potential of the current flowing through the rails. The current flowing through the rails may be the return-current of the system when the latter is in use; but the said current can be supplied to the rails from a source extraneous to that of the railway system, if so desired. In other words, the operator after starting the circuit-breaker in operation moves the rheostat-lever over the resistance-points until he obtains silence in the telephone. For example, if the lever is moved to the point 2 and no sound is heard at the telephone then the resistance of the rail-joint 68 is equal to twice the three feet mentioned above, or six feet of rail. If the position of silence is obtained between two of the contact-points, then the resistance is obtained by multiplying the indication on the scale by the three feet of standard length—as, for instance, when the rheostat-lever is between the points 3 and 4 and no sound is heard at the telephone then the resistance would be obtained by multiplying three and one-half by the three feet of standard resistance. It will thus be seen that with the instrument herein shown a single person can operate the instrument and effect the testing of the rail-joint in a substantially short time, because it is only necessary for him after obtaining the proper contact between the chisel-points and the rails, as above described, to move the rheostat-switch.

The instrument can be used substantially in the same way as the instrument described in the patent above referred to—namely, by moving the two-way switch f onto the terminal plate d, with the rheostat-switch on its first point. The telephone is then in circuit simply with the rail-joint, and this sound becomes louder and louder the higher the rail-joint resistance. When the two-way switch f is thrown onto the terminal e, the sound at the telephone is produced from the standard length of rail included between the center point or chisel 44 and the outer chisel 43, which is the standard length—namely, three feet in the present instance. With the two-way switch in its middle position the rail-joint is opposed to the sound of the standard length of rail and if equal to it kills it, so that there is silence in the telephone. As the rail-joint is usually the louder, the purpose of the rheostat is to enable a determination to be made substantially in an instant of how much greater is the sound from the rail-joint than from the three feet of rail. This is accomplished with the two-way switch in its middle position by moving the rheostat-switch over its points, which cuts down the joint-sound until it is equal to the rail-sound, thereby killing it. When this condition is obtained, all that is necessary for the operator to do is to multiply the number on the scale at which the rheostat-switch is stopped by three.

While I prefer to employ the telephone and the circuit-breaker in connection with the rheostat and tripartite contact apparatus herein shown, I do not desire to limit my invention in this respect, as the rheostat and the tripartite contact apparatus can be used to advantage with other forms of indicating instrument—as, for instance, instead of the telephone and the circuit-breaker and kicking-coil I may employ one or more galvanometers or other meters 66, as indicated in Fig. 5—the advantage to this form of instrument being that it is rendered more efficient by reason of the fact that the readings are rendered easier to take with the fluctuating currents ordinarily existing in the rails, and, further, a superior contact is obtained with the tripartite contact apparatus.

In the diagram Fig. 4 I have shown a duplicate break-wheel and motor mechanism, which in practice may be secured to the partition-wall 2 and located in the compartment 5 ready for use in case of accident to the motor mechanism for the break-wheel in compartment 8.

I prefer to use the kicking or self-inductive coil 29, as it concentrates the available energy on the break in the telephone-circuit, and practically no sound is obtained on the make.

I claim—

1. In an apparatus of the character described, the combination with two independent metallic circuits having a conductor common to both, a source of current for said circuits, a telephone-receiver in the common conductor, a rheostat having its resistance-coils connected with one side of one circuit and with the common conductor around or in shunt with the telephone-receiver, and a rheostat-switch coöperating with said coils.

2. In an apparatus of the character described, a tripartite contact apparatus comprising a pole or upright, a center contact member or terminal, spring-arms extended in opposite directions from the said center contact member and provided with contact-terminals near their outer end, substantially as described.

3. In an apparatus of the character described, a tripartite contact apparatus comprising a center contact member or terminal, spring-arms extended in opposite directions from the said center contact member and provided with contact-terminals having their cutting edges extended substantially at right angles to the cutting edge of the center contact-terminal, substantially as described.

4. An apparatus for measuring electrical resistances, comprising portable terminals adapted to engage the resistance to be measured and to engage a standard resistance, an indicating instrument in circuit with said terminals, and a rheostat having its resistance-coils connected in series with the resistance to be measured, and its switch in series with said indicating instrument and coöperating with said resistance-coils to substantially equalize the opposing drops of potential on both sides of the instrument, substantially as described.

5. An apparatus for measuring the electrical resistance of rail-joints, comprising contact-terminals adapted to engage the rails, an indicating instrument in circuit with said terminals, and means in circuit with the indicating instrument and with the rail-joint for substantially equalizing the drop of potential of a standard length of rail with a portion of the drop of potential in the rail-joint, substantially as and for the purpose specified.

6. An apparatus for measuring electrical resistances, comprising a tripartite contact apparatus having two of its contact-terminals in engagement with a known resistance and the other of said contact-terminals with the unknown resistance, an indicating instrument in circuit with the said terminals, and a rheostat in circuit with the indicating instrument, substantially as and for the purpose specified.

In testimony whereof I have signed my name to this specification in the presence of two subscribing witnesses.

ROGER W. CONANT.

Witnesses:
JAS. H. CHURCHILL,
J. MURPHY.